(12) United States Patent
Schlebusch et al.

(10) Patent No.: US 6,613,372 B1
(45) Date of Patent: Sep. 2, 2003

(54) METHOD FOR PRODUCING AN ANIMAL FEED OR FOOD ITEM AND A PRODUCT PRODUCED ACCORDING TO SAID METHOD

(75) Inventors: Johannes P. Schlebusch, Bremen (DE); Andreas Ronken, Verden/Aller (DE); John Hemus, Kirchlinteln (DE); Jürgen Luttmann, Kirchlinteln (DE)

(73) Assignee: Effem GmbH, Verden Aller (DE)

( * ) Notice: Subject to any disclaimer, the term of this patent is extended or adjusted under 35 U.S.C. 154(b) by 0 days.

(21) Appl. No.: 09/582,832

(22) PCT Filed: Dec. 8, 1998

(86) PCT No.: PCT/DE98/03648
§ 371 (c)(1),
(2), (4) Date: Dec. 6, 2000

(87) PCT Pub. No.: WO99/34695
PCT Pub. Date: Jul. 15, 1999

(30) Foreign Application Priority Data

Jan. 8, 1998 (DE) .......................... 198 00 390

(51) Int. Cl.⁷ .............................. A22C 17/00; A23P 1/00
(52) U.S. Cl. .................. 426/513; 426/517; 426/518; 426/646; 426/92; 426/574
(58) Field of Search .................. 426/448, 92, 574, 426/646, 513, 517, 518

(56) References Cited

U.S. PATENT DOCUMENTS 4,113,819 A    9/1978  Hayashi et al. .......... 264/173
4,141,999 A    2/1979  Lolas ...................... 426/104
4,196,222 A    4/1980  Cheney .................... 426/264
4,266,920 A  * 5/1981  Hayashi et al. .......... 425/133.1
4,698,004 A  * 10/1987 Ramarine ................. 425/131.1
4,781,939 A  * 11/1988 Martin et al. ............ 426/646
4,784,862 A  * 11/1988 Wotherspoon
4,888,192 A  * 12/1989 Ramarine ................. 426/488
5,209,156 A    5/1993  Lombard .................. 99/450
5,480,662 A    1/1996  Boode-Boissevain et al. ... 426/94
5,887,415 A  * 3/1999  Matthews et al. ......... 53/76
5,888,131 A  * 3/1999  Kobussen et al. ......... 425/30
5,928,705 A  * 7/1999  Matthews et al. ......... 426/646
5,958,487 A  * 9/1999  Emberger et al. ......... 426/129
6,379,738 B1 * 4/2002  Dingman et al. .......... 426/646

FOREIGN PATENT DOCUMENTS

EP    0265740        * 4/1988
JP    57091153         7/1982
WO    WO 00/18252    * 4/2000

* cited by examiner

Primary Examiner—Nina Bhat
(74) Attorney, Agent, or Firm—Frommer Lawrence & Haug

(57) ABSTRACT

A method for producing an animal feed or food item wherein at least one first flow of a viscous mass solidifies under corresponding first process conditions and at least one second flow of a mass of similar viscosity as the first flow, which second flow liquefies under corresponding second process conditions, are mixed in such a way that the individual flows are superimposed in layers. In a next step the flows are subjected, either sequentially or simultaneously, to the process conditions required for the solidification of the first flow and liquefaction of the second flow. A product produced in accordance with the method is described.

21 Claims, 1 Drawing Sheet

METHOD FOR PRODUCING AN ANIMAL FEED OR FOOD ITEM AND A PRODUCT PRODUCED ACCORDING TO SAID METHOD

This application claims benefit under 35 USC 371 of PCT/DE98/03648 filed Dec. 8, 1998.

BACKGROUND OF THE INVENTION

The invention relates to a method for the manufacture of a food or a feed and to a product manufacturable by it.

The problem arises in the food and feed industry to simply and efficiently manufacture products, which comprise a plurality of densely superimposed and often very thin layers, between which are provided in each case or at least partially a thin air or liquid layer.

A classic example is puff paste, which is also an example for the use of traditional production processes for such products. Although the mechanical production of puff paste nowadays represents a considerable advance, the known methods are still relatively complicated and fault-prone.

Another field of use consists of products produced using meat emulsions. Meat emulsions have long been used in the food and feed industry, particularly in pet foods, to a considerable extent. A need exists for the use of a high proportion of meat raw materials, optionally combined with vegetable proteins, because these represent important nutrient carriers for protein, mineral substances, trace elements, fat and vitamins, are highly compatible and highly digestible, as well as at the same time very tasty and therefore represent an optimum basis for an adequate nutrient uptake.

The general problem in this connection is that non-pretreated meat or fish raw materials almost completely lose their original texture during the unavoidably necessary sterilization process used in the production of corresponding products. However, this is an essential factor for acceptance on the part of humans and animals.

EP-A-265 740 discloses a method for the manufacture of a meat emulsion product, in which a meat emulsion having a specific composition is rapidly heated to temperatures above 100° C., preferably between 104 and 118° C. At such a temperature the animal and vegetable proteins in the emulsion coagulate and denature at a very high speed. The hot emulsion is subsequently pumped into a process tube, where it remains under an overpressure until the proteins have completely coagulated. However, for reasons of nutritional physiology, the premature coagulation and denaturing of preteins in the emulsion has proved to be disadvantageous. In such manufacturing processes, more particularly the meat raw materials lose their texture and an attempt is made to compensate this, although only with a moderate level of success, in the known method by an energy and labour-consuming process stage of controlled evaporation of water present in the emulsion or additional injection of superheated steam for producing a layer-like structure.

German patent 39 33 528 discloses a process, in which a meat emulsion is forced through a gap between plates of a high speed emulsifier into a process tube and rapidly heated to 40 to 75° C. The proteins contained in the starting materials are essentially of animal origin and have different coagulation behaviour characteristics with respect to the temperature and time duration. Although this method permits the production of products having an improved texture and better characteristics from the nutritional physiology standpoint, there are still considerable differences compared with naturally cut meat or fish portions, particularly with regards to the texture. In addition, the known method is relatively difficult to control and leads to not constantly good results.

The problem of the invention is to so improve known methods for the manufacture of foods or feeds, as described hereinbefore, that they lead to superior products and/or the control of the method is much less costly and more efficient.

SUMMARY OF THE INVENTION

According to the invention this problem is solved in the case of the method according to the preamble, in that at least one first material flow of a viscous mass, which hardens under corresponding, first method conditions, and at least one second material flow of a mass with a similar viscosity to the first material flow and which liquefies under corresponding, second method conditions, are so mixed together that the individual material flows are superimposed in layer-like manner and that subsequently, successively or simultaneously, the method conditions for solidifying the first material flow or liquefying the second material flow are implemented.

In a preferred embodiment of the invention the first material flow is a viscous emulsion.

According to another embodiment of the invention, the first or a further first material flow comprises a viscous dough based on flour.

According to the invention the second material flow is a viscous gel.

The invention also proposes that the second or a further second material flow consists of a viscous fat or a viscous, fat-containing substance.

According to an embodiment of the invention the method conditions necessary for solidification is constituted by a time sequence adequate for solidifying the first material flow or flows.

According to another embodiment the optionally additional method conditions necessary for solidifying the first material flow or flows is an application of heat. The heat can be applied in a subsequent sterilization stage.

According to the invention the first and second material flow or flows are used in a weight ratio of 50:50 to 95:5. A weight ratio of approximately 80:20 is particularly preferred.

In an especially preferred embodiment of the invention the first material flow or flows contain meat and/or fish materials or components thereof.

It is particularly preferable if the first material flow or flows additionally contain fibre-like or fibre-containing material.

In a preferred embodiment the first material flow or at least one of the first material flows contains alginate and at least one calcium salt in roughly equimolar quantities.

In a preferred embodiment of the invention the alginate used is sodium alginate and the calcium salt used is calcium sulphate.

In another embodiment of the invention, immediately prior to the mixing with the second material flow or flows, the corresponding material flow is prepared by mixing a mixture containing the calcium salt and an aqueous solution of the alginate.

The dough is of a type conventionally used in the baking industry, such as e.g. puff paste or dough.

In a preferred embodiment the invention proposes that the viscous gel contains a gel-forming substance from the group comprising carboxymethyl cellulose, guar gum and other hydrocolloids.

According to the invention the viscous gel comprises carboxymethyl cellulose.

The invention proposes that the viscous gel contains a calcium salt.

In particularly preferred manner calcium lactate is used as the calcium salt.

According to another embodiment of the invention the fat or fat-containing substance used is a substance normally employed in the baking industry, such as e.g. margarine, butter, butter fat or pastry fat.

In another embodiment of the invention the mass resulting from the super-imposed single material flows is cut into suitable sizes following solidification.

According to a preferred embodiment of the invention at least one first material flow and at least one second material flow are supplied separately from one another to a distributing zone running circumferentially about a longitudinal axis, the distributing zones being separated from one another, each material flow is passed into a delivery zone following onto the distributing zone, the delivery zones being separate from one another and distributed in juxtaposed manner around the longitudinal axis and connected to the in each case associated distributing zone, the material flows passing out of the delivery zones with in each case predetermined cross-sectional shape and surface are passed longitudinally within a given overall cross-section, and in their arrangement as a whole the delivery zones are rotated about the longitudinal axis, the individual material flows being spirally superimposed in layer-like manner.

The invention proposes that the distributing zones are circular or annular in cross-section.

Appropriately at least one delivery zone is slot-like in cross-section.

Appropriately at least one delivery zone is circular sector-shaped in cross-section.

In another embodiment of the invention the at least one delivery zone is split up into a row of radially succeeding partial zones.

According to a particularly preferred embodiment of the invention two material flows and two delivery zones are used.

It is also possible for the discharged material to be guided in a cross-section changing in defined manner in the longitudinal direction.

The invention also relates to a feed or food manufacturable according to the method of the invention, provided that the first material flow comprises a viscous emulsion, preferably a meat emulsion.

The fundamental idea of the invention is based on the fact that it is surprisingly efficiently and inexpensively possible to manufacture the desired products in that at least two viscous masses, which behave differently under corresponding method conditions, namely firstly a solidified mass and secondly a liquefied mass, are mixed with a suitable mixing process permitting the superimposing of optionally thin layers.

Following onto the mixing process initially firstly there is a passage through the solidification mechanism (e.g. chemical reaction of alginate with calcium salts, heat application, etc.), in order to prestructure the product. This is followed by process conditions under which the second viscous mass is liquefied, so that the latter can optionally at least partly be discharged.

In the case of the manufacture of a lumpy feed based on a meat emulsion, the cutting into pieces can take place before, during or after the solidification stage. For such a product a preferred solidification stage is the chemical reaction of alginate with calcium salts, which has been fundamentally been well known for decades from the food and feed technology field.

The lumpy products, i.e. in alternating manner a solidified meat emulsion layer and a viscous gel layer, can then be packed, e.g. canned in this form and accompanied by the addition of a corresponding gravy. During the subsequent sterilization stage, the viscous gel is liquefied and largely passes out into the surrounding medium, in order to leave behind the corresponding, desired, layer-like material, which is very similar to natural pieces of meat. In this case the method is particularly economic, because the liquefaction stage is performed automatically during a method stage which must in all cases be carried out, namely sterilization.

In the case of the manufacture of a dough or paste product, such as e.g. puff paste, following mixing and discharging from the mixing apparatus and optionally following portioning, initially the aforementioned solidification stage is passed through, i.e. the baking stage. In this case the liquefaction stage of the intermediate layer of fat or fat-containing substance takes place simultaneously with the solidification stage, because for one mass, namely the paste, the heat application brings about solidification, whereas for the other mass, namely the fat or fat-containing substance, it brings about liquefaction. The liquefying fat can firstly pass out laterally and be collected, but is largely absorbed by or remains between the dough or paste layers.

Obviously the method according to the invention is not restricted to the two fields of application described in detail, but can instead be used where corresponding, layer-like products are to be produced, provided that it is possible to fulfil two essential fundamental conditions, firstly the setting of roughly identical viscosity for the mixing stage, because it would otherwise be difficult to achieve a corresponding layer structure of the materials, and secondly the composition of the material flows must be so selectable that one material flow solidifies under corresponding method conditions and the other material flow liquefies under corresponding method conditions, in which said method conditions need not necessarily be identical, such as e.g. heat application, but it must at least be ensured that the method conditions leading to the solidification of one material flow do not so modify the other material flow that a subsequent liquefaction would be prevented.

In order to further illustrate the invention hereinafter the particularly preferred mixing process is described, which makes it possible in an optimum manner to arrange in superimposed layers different, viscous masses. This process is further illustrated by the attached drawings, wherein show:

DESCRIPTION OF THE PREFERRED EMBODIMENT

Figure 1:
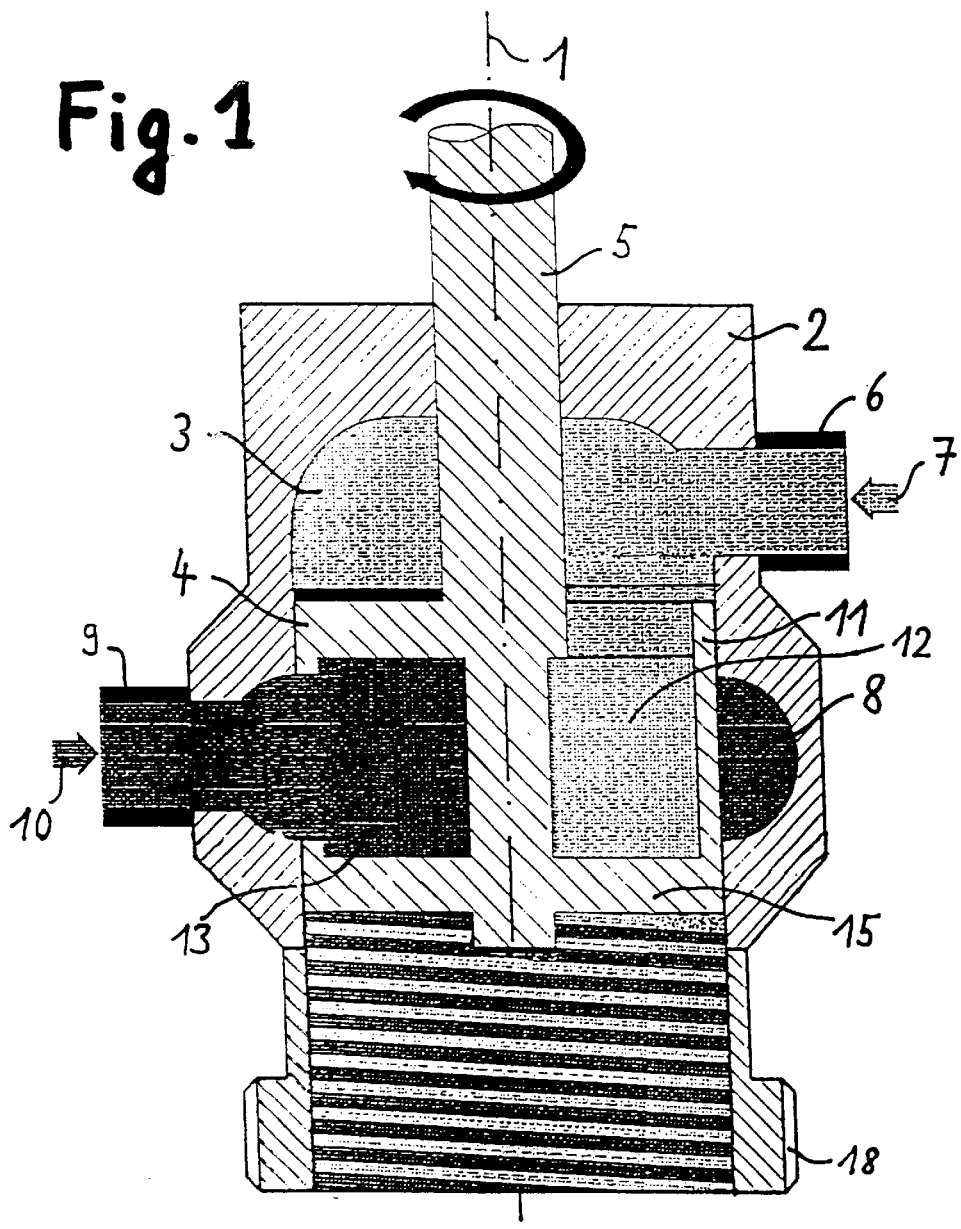
FIG. 1A longitudinal section through an apparatus for performing the method according to the invention.

FIG. 1 shows a diagrammatic sectional view of an apparatus according to the invention, along a longitudinal axis 1. A casing 2 has a cylindrical inner space, in which is rotatably held a cylindrical rotor 4, the outer wall of the rotor forming with the inner wall of the casing a substantially sealing guide. The rotor can be rotated about the axis 1 by means of a shaft 5, which extends upwards out of the casing.

Above the rotor 4, the upper end of the cylindrical inner space forms an annular, first distributing chamber 3, which is connected with a substantially radially positioned, first feed 6, through which the flowable material can be supplied in the direction of the arrow 7.

In its central area, the casing 2 has a second, annular distributing chamber 8, which surrounds the rotor and to which is connected a substantially radially directed feed 9, by means of which, in the direction of the arrow 10, flowable material can be introduced into the chamber 8.

Figure 2:
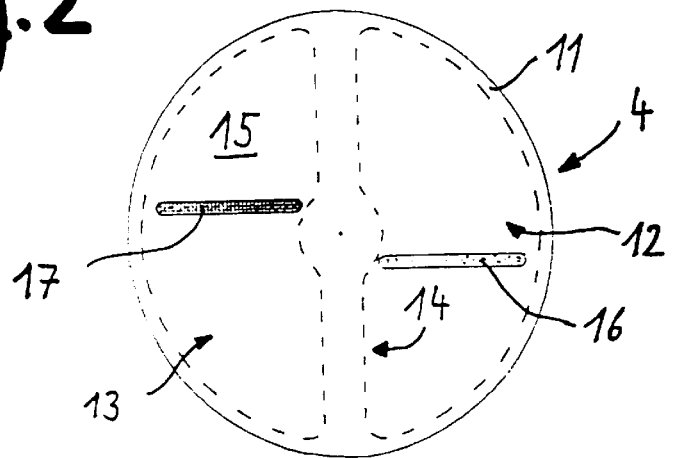
FIG. 2A view of the rotor of the apparatus according to FIG. 1 from below.

As shown in FIG. 2, which is a view of the cylindrical rotor 4 from below or onto its bottom 15, the rotor is substantially hollow and within its cylindrical outer wall 11 (broken line representation) has a first 12 and a second delivery chamber 13, which in each case take up roughly half the circumference or inner space and are mutually demarcated by a vertical partition 14 (broken line representation).

According to FIG. 1, the top end of the chamber 12 is connected over its entire cross-sectional surface with the first distributing chamber 3 and namely in each rotary position of the rotor, because the distributing chamber 3 extends in annular manner over the total circumference. The same applies regarding chamber 13, which is connected by means of an opening not shown in FIG. 2, but visible in FIG. 1, with the second distributing chamber 8. As the distributing chamber 8 is also annular, in each rotor rotation position, the chamber 13 is connected to said rotor. As stated hereinbefore, each of the chambers 3 and 8 is connected to a feed 7, 9. The cohesive volume areas formed in this way are patterned light (6, 3, 12) and dark (9, 8, 13) in FIG. 1.

The outlet opening 16, 17 in the rotor bottom 15 shown in FIG. 2 are connected to the delivery chambers 12, 13, the opening 16 being associated with chamber 12 and the opening 17 with chamber 13.

In an alternative embodiment the chambers 12, 13 could correspond cross-sectionally to the outlet opening 16, 17 and e.g. be constructed as slot-like recesses within the rotor. It would also be possible to have a row of radially juxtaposed bores parallel to the longitudinal axis.

Hereinafter details will be given of the operation of the apparatus according to the invention. In operation the rotor 4 is rotated by means of its shaft 5 projecting out of the casing 2. As a result of the described arrangement of the chambers, there is always a through connection from the first feed 7, via the chambers 3, 12 to the outlet opening 16 on the one hand and from the second feed 9, via the chambers 8, 13 to the outlet opening 17 on the other. By means of said feeds 6, 9 are e.g. supplied the meat emulsions or viscous gel to the chambers. After passing through the arrangement the supplied materials are continuously fed to the outlet openings 16 and 17, through which they are discharged in the extension of the cylindrical inner space of the casing 2 below the rotor bottom 15. As a result of the continuous throughput of the two material flows and the rotation of the outlet openings, the discharged material masses form layers, which are spirally, alternately superimposed, as shown in the lower part of FIG. 1.

The layer thickness of the individual layers can be controlled by the setting of the rotational speed of the rotor 4 and the flow rate of the material flows. The layer thickness and other structure of the material can be modified via the dimensions of the outlet openings 16, 17. Other variation possibilities exist through providing more or less narrow slots or rows of holes as outlet faces.

In addition, within the rotor there need not only be two, but also a larger number of delivery chambers. For example, there could be an even number of chambers, which are alternately supplied with material by means of the stationary chamber 3 above the rotor and the annular chamber 8 round the rotor.

It is obviously possible to extend the inventive principle in such a way that three or more chambers are provided within the rotor and which can be supplied with material, e.g. by several juxtaposed annular chambers in the form of chamber 8 and an upper chamber in the form of chamber 3 and then more than two different feeds with different materials are possible. Also in such a construction the rotor could have several delivery chambers for in each case one annular or distributing chamber.

The material flow passing out of the lower end of the apparatus according to FIG. 1 can be directly further processed in this form. However, according to an advantageous variant, the cylindrical delivery area directly below the rotor 4 can be followed by a shaping nozzle, e.g. via a threaded connection 18, so that the material leaving the apparatus undergoes a clearly defined cross-sectional change. Firstly only the shape of the cross-section could be changed. It would also be possible for the shaping nozzle to force on the material flow a narrowing or widening of the cross-section and the layer thicknesses of the previously formed material can be changed in planned form. In particular, this makes it possible to form ultra-fine layers, as is not possible or not satisfactorily possible with existing methods.

Hereinafter a detailed description is given of the manufacture of lumpy feeds based on meat emulsions.

With the above-described mixing process, in the preferred embodiment of the invention, two material flows A and B are brought together, which have the following composition.

TABLE 1

Composition: material flow A (gel)

| Constituents | Range | Preferred |
|---|---|---|
| Carboxymethyl cellulose | 1 to 20 wt. % | 4 wt. % |
| Calcium lactate | 0.0 to 10 wt. % | 2 wt. % |
| Water | 70 to 98.5 wt. % | 94 wt. % |

TABLE 2

Composition: material flow B (emulsion)

| Constituents | Range | Preferred |
|---|---|---|
| Meat or fish materials | 30 to 60 wt. % | 48 |
| Wheat flour or corn starch | 10 to 30 wt. % | 20 |
| Fibrous material | 5 to 12 wt. % | 8 |
| Other additives (vitamins, mineral mixture, etc.) | 1 to 10 wt. % | 6 |
| Water | 10 to 30 wt. % | |

Material flow A gives the viscous gel. Prior to the feeding thereof to the above-described apparatus (hereinafter called ITN mixing head) it is prepared with hot water in a conventional mixing device (or in an adequate, continuous process), in order to achieve a maximum viscosity. In the preferred embodiment described in greater detail hereinafter it contains calcium lactate as a readily available calcium ion source, in order to ensure that the structure produced in the ITN mixing head is rapidly fixed.

Material flow B is also prepared in a conventional mixing device (or in an adequate, continuous process) and the result is an emulsion based on meat or fish materials, which can be directly supplied to the ITN mixing head in the embodiment of example 1. In the embodiment of example 2, prior to the supply to the ITN mixing head, material flow B is mixed with an aqueous sodium alginate solution in a high-performance mixer.

EXAMPLE 1

A viscous gel is prepared in the aforementioned manner. In the present embodiment the gel-forming substance used is a carboxymethyl cellulose, which for low concentration gives a high viscosity, namely Blanose 7H4CF supplied by Aqualon/Hercules. 4 wt. % carboxymethyl cellulose powder and 2 wt. % calcium lactate are mixed with 94 wt. % hot water. The viscous gel is introduced into the ITN mixing head at a speed of 6 kg/min, using a Mohno pump.

The second chamber of the ITN mixing head is supplied with a fibrous meat emulsion, as indicated hereinbefore, at a speed of 24 kg/min, i.e. the weight ratio of gel to meat emulsion is 20:80.

The ITN mixing head is operated at a speed of 200 r.p.m. The mixing plate of the ITN mixing head has, in a preferred embodiment of the invention, a diameter of 100 mm, with two parallel slots, one having a width of 6 mm (length 32 mm/220 mm$^2$) for the viscous gel and the other having a width of 8 mm (length 31 mm/298 mm$^2$) for the meat emulsion. Both slots have the same setting angle of 15° to the longitudinal axis of the ITN mixing head, in order to pass radially to the outside the gel or emulsion forced in there.

The ITN mixing head leads into a pipe having a diameter of 100 mm and a length of 340 mm. The diameter is reduced from 100 to 65 mm over a length of 125 mm. With this diameter the pipe ends in a 90° bend. The corresponding material flow is discharged at a speed of 30 kg/min. Several layers of the material flow are pumped above one another in order to form an approximately 200 mm high layer. This layer structure is passed on a conveyor belt through a superheated steam tunnel, in order to solidify therein to a coherent mass.

The solidified mass is subsequently cut into cubes having different dimensions. The lump end product is processed further in known manner, e.g. canned together with a gravy. It is decisive that one of the subsequent process stages consists of sterilization at conventional temperatures in order to achieve the desired effect, i.e. liquefaction of the gel layers, in order to give the desired, fibrous, layer-like structure of the individual pieces.

EXAMPLE 2

The production and supply of the viscous gel take place as in example 1. To the similarly composed meat emulsion (but with a calcium sulphate content roughly equimolar to the admixed sodium alginate), prior to the supply to the ITN mixing head, in a high-speed mixer, is added an aqueous sodium alginate solution (approximately 6 wt. %) in a mixing ratio of approximately 3:5. This mixture is supplied to the ITN mixing head in the manner described in example 1.

The layer structure discharged from the process tube following onto the ITN mixing head solidifies through the chemical reaction of the sodium alginate with the calcium sulphate in the meat emulsion without any further heat treatment as in example 1. The further processing of the solidified layer structure takes place in the same way as in example 1.

For the production of puff paste an identical mixing process can be used. The material flows brought together for this purpose can be gathered from the following tables.

TABLE 3

Composition: material flow C (fat)

| Constituents | Range | Preferred |
| --- | --- | --- |
| Margarine (butter, butter fat, pastry fat) | 70 to 100 wt. % | 84 wt. % |
| Wheat flour | 0 to 30 wt. % | 16 wt. % |

TABLE 4

Composition: material flow D (dough)

| Constituents | range | Preferred |
| --- | --- | --- |
| Wheat flour | 50 to 90 wt. % | 70 wt. % |
| Water | 10 to 50 wt. % | 27 wt. % |
| Salt | 0 to 10 wt. % | 2 wt. % |
| Other additives (sugar, etc.) | 1 to 10 wt. % | 1 wt. % |

Material flow C gives the fat phase. It is heated to approximately 35 to 40° prior to supplying to the ITN mixing head and is mixed in a conventional mixing apparatus (or in an adequate, continuous process) with the flour in order to obtain a flexible fat phase.

Material flow D gives the paste or dough phase. It is also prepared in a conventional mixing apparatus (or in an adequate, continuous process) and the result is a dough based on cereal flour and water, which in the embodiment of example 3 can be directly supplied to the ITN mixing head.

EXAMPLE 3

The fat phase C and dough phase D are supplied to the ITN mixing head with in each case a mass flow of 15 kg/min. The fat to dough mixing ratio is 50:50. The ITN mixing head is operated at a speed of 200 r.p.m. The ITN mixing head is described in detail in example 1. The ITN mixing head leads into a pipe with a diameter of 100 mm and a length of 340 mm, to which is connected a carpet shaping nozzle, in which a circular cross-section constantly tapers over a length of 500 mm to a thin rectangle of height 3 mm and length 500 mm. The fat-dough mixture produced in the ITN mixing head is transformed into a puff dough or paste structure by punching out a flow profile in the carpet shaping nozzle.

The resulting puff paste carpet can be cut into plates and can either be given good keeping characteristics by deep freezing or directly further processed. The layer structure is formed during a subsequent heat treatment in a baking oven, baking line, etc.

The features of the invention disclosed in the above description and claims can be essential to the implementation of the different embodiments of the invention, either singly or in random combination.

What is claimed is:

1. A method for the manufacture of a feed or food wherein at least one first material flow of a viscous emulsion on the basis of meat and/or fish or components thereof which solidifies under a first method condition and at least one second material flow of a mass with a similar viscosity to said first material flow are mixed together to superimpose said first and second material flows in layers, said second material flow having the property of liquefying under a second method condition; and after the first method condition for solidification of the first material flow and then the method condition for liquefying of the second material flow have been applied, the second material flow is at least partially discharged from the product.

2. A method according to claim 1 wherein said second material flow comprises a viscous gel.

3. A method according to claim 2 wherein said viscous gel contains a gel-forming substance selected form the group consisting of carboxymethyl cellulose, guar gum and hydrocolloids.

4. A method according to claim 2 wherein said viscous gel contains a calcium salt.

5. A method according to claim 2 wherein said viscous gel contains calcium lactate.

6. A method according to claim 1 wherein the method condition to effect solidification of said first material flow comprises a time sequence adequate to allow solidification of said first material flow.

7. A method according to claim 1 wherein the method condition to effect solidification comprises applying heat.

8. A method according to claim 7 wherein heat in applied to a sterilization step.

9. A method according to claim 1 wherein said first and second material flows are used in weight ratio of from 50:50 to 95:5.

10. A method according to claim 9 wherein said weight ratio is approximately 80:20.

11. A method according to claim 1 wherein said first material flow additionally contains fibrous or fiber containing material.

12. A method according to claim 1 wherein said first material flow contains alginate and at least one calcium salt in approximately equimolar quantities.

13. A method according to claim 1 wherein said first material flow contains sodium alginate and calcium sulfate as a calcium salt.

14. A method according to claim 13 wherein said first material flow prior to mixing with said second material flow is mixed as a mixture containing said calcium salt and an aqueous solution of sodium alginate.

15. A method according to claim 1 wherein the at least one first material flow and the at least one second material flow are supplied separately form one another to a distributing zone running circumferentially about a longitudinal axis, the distributing zones being separated from one another, each material flow is passed into a delivery zone following onto the distributing zone, the delivery zones being separate from one another and distributed in juxtaposed manner around the longitudinal axis and connected in each case with the associated distributing zone, the material flows passing out of the delivery zones with in each case predetermined cross-sectional shape and surface and are passed longitudinally within a given overall cross-section, and in their arrangement as a whole the delivery zones are rotated about the longitudinal axis, the individual material flows being spirally superimposed in layer-like manner.

16. A method according to claim 15 wherein the distributing zones are circular or annular in cross-section.

17. A method according to claim 16 wherein at least one delivery zone is slot-like in cross section.

18. A method according to claim 16 wherein at least one delivery zone is circular sector-like in cross-section.

19. A method according to claim 16 wherein at least one delivery zone is subdivided into a row of radially succeeding partial zones.

20. A method according to claim 16 wherein two materials flows and two delivery zones are used.

21. A method according to claim 16 wherein the material discharged is guided in a cross-section varying in a defined manner in the longitudinal direction.

* * * * *